Figure 1:
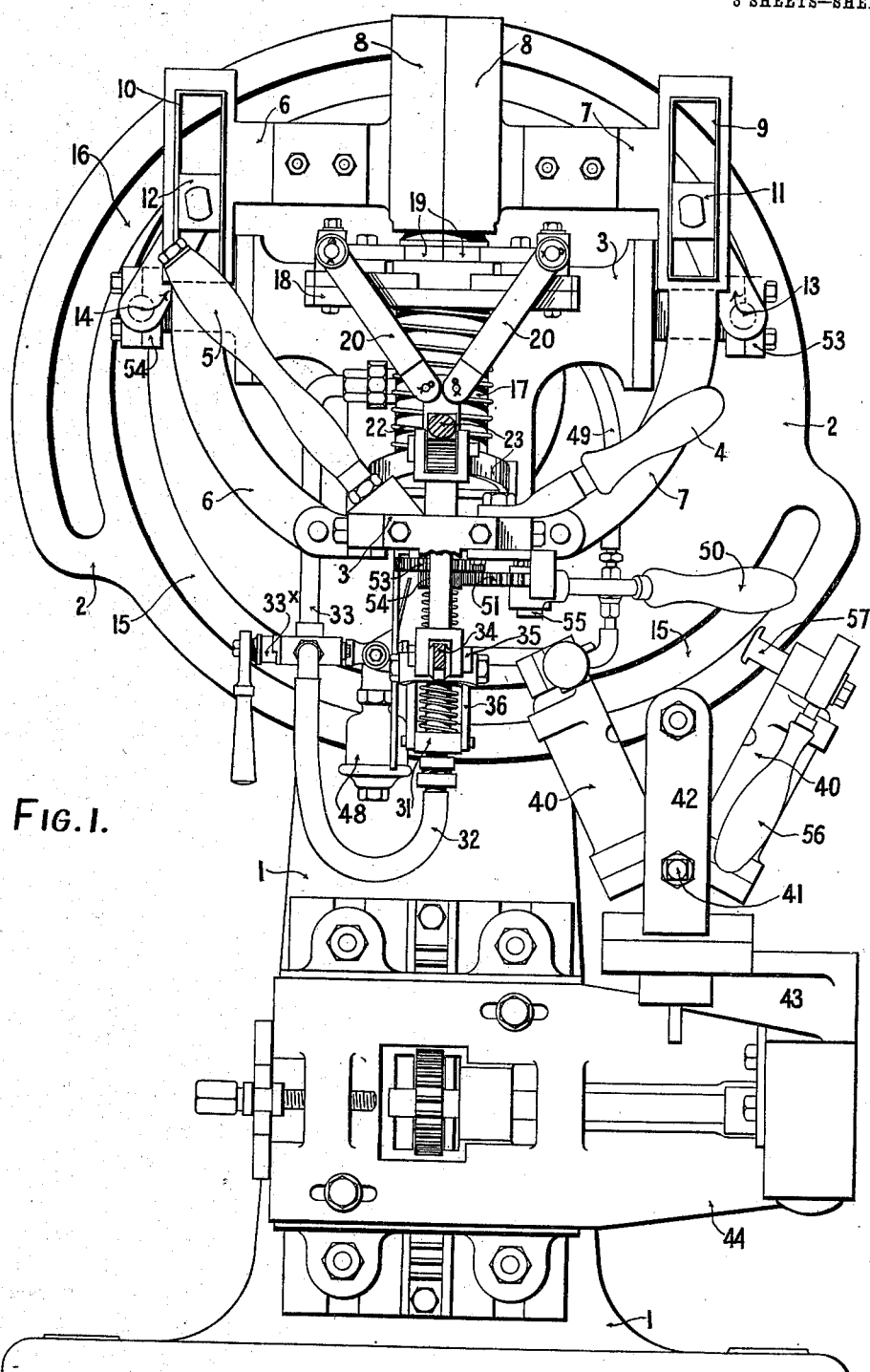

No. 732,902. PATENTED JULY 7, 1903.
T. W. SIMPSON.
MACHINE FOR MANUFACTURING GLASS BOTTLES.
APPLICATION FILED MAY 13, 1902.
NO MODEL. 3 SHEETS—SHEET 1.

Witnesses. Inventor.
Thomas William Simpson

No. 732,902. PATENTED JULY 7, 1903.
T. W. SIMPSON.
MACHINE FOR MANUFACTURING GLASS BOTTLES.
APPLICATION FILED MAY 13, 1902.
NO MODEL. 3 SHEETS—SHEET 2.
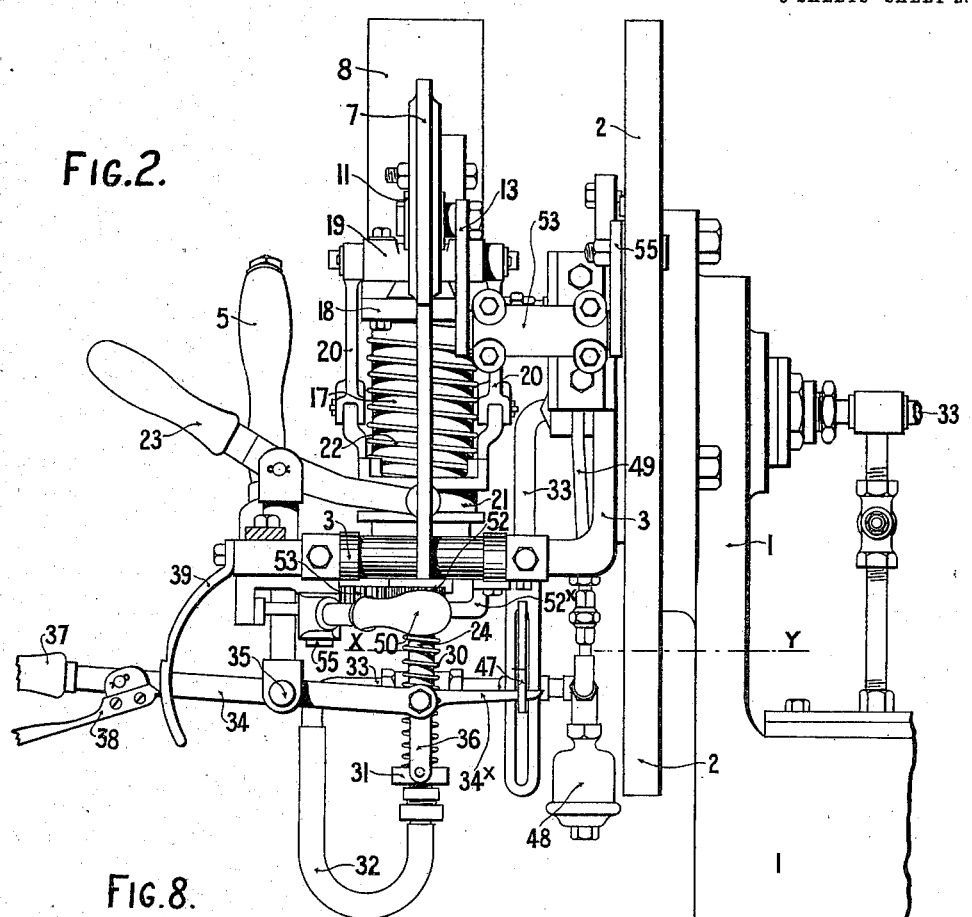
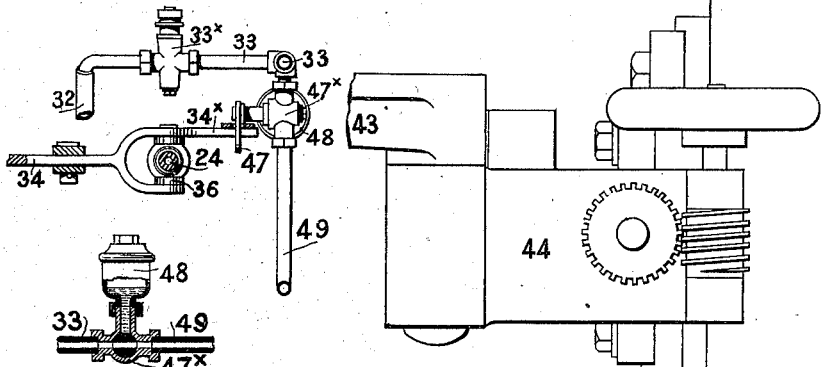

No. 732,902. PATENTED JULY 7, 1903.
T. W. SIMPSON.
MACHINE FOR MANUFACTURING GLASS BOTTLES.
APPLICATION FILED MAY 13, 1902.
NO MODEL. 3 SHEETS—SHEET 3.
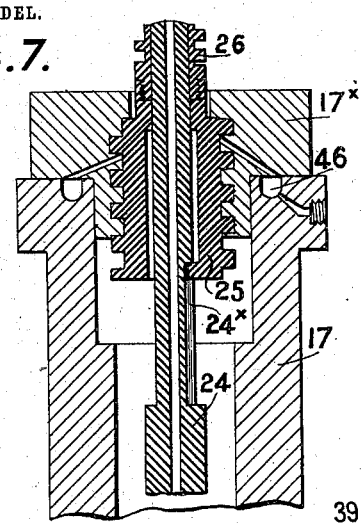
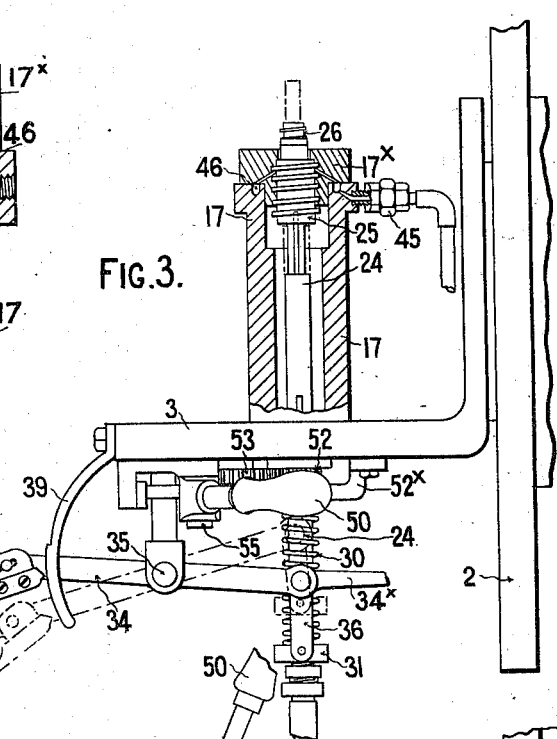
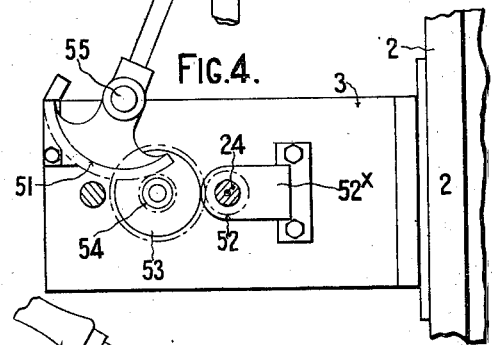
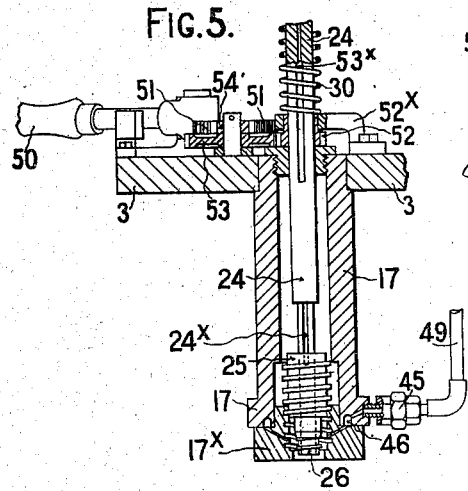
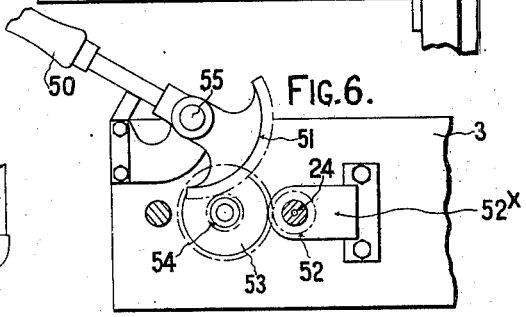
Witnesses
C. H. Walker.
E. Thos. Loftus
Inventor.
Thomas William Simpson
By his Attorney, No. 732,902. Patented July 7, 1903.

UNITED STATES PATENT OFFICE.

THOMAS WILLIAM SIMPSON, OF METHLEY, ENGLAND.

MACHINE FOR MANUFACTURING GLASS BOTTLES.

SPECIFICATION forming part of Letters Patent No. 732,902, dated July 7, 1903.

Application filed May 13, 1902. Serial No. 107,192. (No model.)

*To all whom it may concern:*

Be it known that I, THOMAS WILLIAM SIMPSON, a subject of the King of Great Britain, and a resident of the Old Rectory, Methley, near Leeds, in the county of York, England, have invented certain new and useful Improvements in Machines for Manufacturing Glass Bottles, of which the following is a specification.

In manufacturing glass bottles by machines constructed for this use and which have long been known the molten glass is commonly placed into a parison or preliminary mold below which is a neck-mold into which the molten glass also enters and the parison so formed is then pierced by an instrument which enters through the neck. The parison-mold is then inverted and its parts removed, leaving the parison itself hanging by its neck and ready to be inclosed in a dividable finishing-mold in which the blowing is completed, and finally the bottle is removed by opening the neck-mold. Machines in which it has been proposed to carry out such a process are, as I have before stated, well known, and in an application for a United States Patent made by myself and filed May 13, 1902, Serial No. 107,191, I have described a machine operating on the lines first stated and comprising improved constructions and arrangements. Such a machine has a horizontal shaft carried in bearings upon a stationary frame, the shaft being adapted to carry a bracket which is capable of being reversed in position by turning the shaft through one hundred and eighty degrees. This bracket carries a separable neck-mold axially in line with which there is a sleeve or sheath, and through the sheath there extends an annular nipple with a plunger passing through it, while a separable parison-mold is carried upon the same bracket. The plunger and nipple are capable of motions relatively to the sheath by which they are carried and relatively to each other. The parison-mold when it is closed and located above the neck-mold receives its supply of molten metal, the nipple entering the neck-mold to form the neck and the plunger operating to pierce the parison. Upon the inversion of the bracket which carries these parts the neck-mold is mechanically opened, leaving the parison suspended by its neck to be inclosed in a separable finishing-mold located below the bracket, in which mold the blowing is completed, the pressure-air for this purpose passing through the plunger, which is made tubular. Upon the bottle having been acted upon by the finishing-mold and the neck-mold having been opened, the nipple and plunger are simultaneously withdrawn from the bottle-neck, leaving the bottle free to be moved away by a horizontal translation motion of the finishing-mold, within which the bottle is contained.

Now the present invention refers to devices involving the annular nipple and the plunger and their coacting parts so constructed, arranged, and operated as to be adapted to produce a bottle having a screw-thread in the interior of the neck. The construction also permits the nipple when withdrawn into the plunger being subjected to the action of an oil and air spray.

In order to render the present invention readily understood, which invention, as I have just stated, mainly centers itself around the constructions and combinations of parts by which the neck of the bottle, with its screw-thread, is formed, I will now describe the same as applied to the construction of machine before mentioned for manufacturing glass bottles, to which my present invention is eminently applicable.

Referring to the accompanying drawings, Figure 1 is a front sectional elevation of the machine aforesaid to which I have shown my present improvements applied, and Fig. 2 is a side elevation of the same machine. Fig. 3 shows in side elevation the revoluble bracket, the sleeve or sheath containing the nipple and plunger being shown in section, all constructed according to my invention. Fig. 4 is an inverted sectional plan view projected from Fig. 3 to illustrate the operating mechanism. These two views (Figs. 3 and 4) illustrate the parts with the nipple in the extended position. Fig. 5 is a sectional side elevation of a portion of the same bracket, showing the sheath or sleeve carrying the nipple and plunger in its inverted position with the nipple and plunger withdrawn into the sheath; and Fig. 6 is a plan view of Fig. 5, showing the position of operating mechanism of the latter figure. Fig. 7 is a vertical section of the nipple and plunger in the position shown at Fig. 3 and drawn to a larger scale. Fig. 8 is a horizontal section taken on the line X Y of Fig. 2 to show the cock and connections for delivering the compressed air and oil supply, and Fig. 9 is a vertical section of the oil-reservoir and delivery-cock shown in the reverse position to Figs. 1 and 2.

Referring then to Figs. 1 and 2 of the drawings, the machine there shown consists of a main standard 1, upon the front face of which is fixed or formed a stationary cam-plate 2. Passing through the upper part of the standard 1 and cam-plate 2 in suitable bearings is a revoluble shaft, upon the end of which contiguous to the face of the cam-plate is fixed an L-shaped bracket 3, (see also Fig. 3,) and this L-shaped bracket is fitted at the front of its horizontal portion, Fig. 1, with handles 4 5, by which the said bracket can be rotated. Upon opposite sides of the horizontal portion of the bracket 3 there are pivoted oppositely-situated arms 6 7, which in the position of the apparatus shown in Figs. 1, 2, and 3 extend upwardly and carry the two separable halves of the parison-mold 8.

In this machine it is provided that by the act of rotating the bracket 3 and the parts which it carries from the position shown in Figs. 1, 2, and 3 through one hundred and eighty degrees (whereby the parts are inverted) this half-rotation shall cause the separation of the halves which compose the parison-mold. To this end the arms 6 7 are formed with slots 9 10, in which are located slide-blocks 11 12. These slide-blocks 11 12 are carried by crank-pins of the crank-arms 13 14, the latter arms being fixed, respectively, to shafts carried in bearings 53 54, which are fixed to or form a part of the bracket 3. The opposite ends of the shafts carrying the crank-arms 13 14 are adjacent to the cam-plate 2, and upon these adjacent ends the said shafts carry arms 55, Fig. 2, and the arms 55 carry rollers which travel, respectively, in cam-grooves 15 16, formed in the cam-plate 2, and the cam-grooves thus act to open the parison-mold as the same is inverted and to again close the said mold when it is caused to resume the position shown in the drawings.

Upon the horizontal portion of the bracket 3 I fix the normally upstanding sheath 17, the upper part of which carries a horizontal guideway 18, in which are supported the two parts of the divided neck-mold 19. Each half of the said mold 19 is connected by links 20 to a vertically-movable sleeve 21, which is held in a position to maintain the neck-mold closed by a spring 22, situated around the bracket-sheath.

By raising the movable sleeve 21 by means of a hand-lever 23, which is pivoted upon the bracket 3, the links 20 act to separate the two halves of the neck-mold horizontally from each other against the action of the spring 22.

Now according to my present invention in order to produce a screw-thread within the interior of the bottle-neck I provide an end cap $17^\times$ upon the end of the sheath 17. The cap $17^\times$ is formed with a screw-threaded hole to receive a tubular nipple 26, which nipple is screw-threaded, its office being to enter the neck-mold 19 and to form the thread in the molten metal. The said nipple 26 is connected to a sleeve 25, which is also screw-threaded, (see Figs. 3, 5, and 7,) and the screw-thread of the sleeve 25 engages in the end cap $17^\times$ aforesaid, which end cap forms a fixed nut for the nipple. By rotating the sleeve 25, and consequently the nipple 26, the latter will be either projected into the neck-mold that is projected into the position shown at Fig. 3 or it will be withdrawn, as in the position at Fig. 5, according to the direction in which the nipple-sleeve is turned. The nipple 26 and its sleeve 25 are tubular in order to permit of the passage through this part of a plunger 24, which extends through the sheath 17, which forms a part of the bracket 3, and beyond the horizontal portion of that bracket the plunger 24 is fitted with a freely-revoluble collar 31, having trunnions to receive links 36, the opposite ends of which links 36 are pivoted to the end of a lever 34, having an operating-handle 37, fulcrumed upon an arm extending from the horizontal portion of the bracket 3. 30 is a helical spring upon the plunger below the bracket 3, Fig. 3, which normally maintains the plunger in the position shown at Fig. 5—that is, with its end flush with the end of the nipple 26. The plunger 24, Fig. 7, is grooved longitudinally at $24^\times$, and engaging with this groove there is a projection from the screw-sleeve 25 which prevents the plunger end being brought below the outer end of the upwardly-projecting nipple 26, while it also prevents the sleeve 25 and the nipple 26 revolving relatively to the plunger and permits the plunger 24 to be projected beyond the end of the nipple. From this construction it will be seen that if the plunger 24 is rotated in either direction it will also cause the rotation of the sleeve 25 and of the nipple 26, and according to the direction of rotation of that plunger the nipple 26 will be caused to project beyond the outer face of the cap $17^\times$ or be drawn flush with that cap. At the same time the plunger 24 can be slid in the direction of its axis relatively to the nipple 26, so as to cause it either to be flush with the end of the nipple 26, as shown at Fig. 5, or to be projected beyond the end of the nipple, as indicated by the dotted lines at Fig. 3. The plunger 24 is tubular and has a bearing in the outer end of the sleeve 25 and also a bearing where it passes through the bracket 3. In order to rotate the plunger when required in either direction and to effect the rotation of the sleeve 25 for the projection and withdrawal of the nipple 26, the plunger 24 upon the lower side of the horizontal part of the bracket 3, as shown at Fig. 3, the upper side of the bracket 3, as shown at Fig. 5, is fitted with a toothed pinion 52, which is loose upon the plunger 24, the pinion 52 being supported between the bracket-bearing of the plunger 24 and a bracket-arm 52$^\times$, mounted upon the bracket 3. There is a longitudinal groove 53$^\times$ in the plunger and a feather on the pinion 52, which engages with that groove. The pinion 52 gears with a spur-wheel 53, mounted upon a stud on the bracket 3, and the spur-wheel 53 is formed with a pinion 54, which gears with a toothed sector 51, pivoted upon a stud 55 upon the bracket 3 and provided with an extending arm and a handle 50, by which the segment can be rocked upon its fulcrum 55, and when so rocked the pinion 54, spur-wheel 53, and pinion 52 will be turned and the plunger thereby rotated in one direction or the other, according to the direction of operation of the handle 50.

The plunger 24, at its lower end, in Figs. 2 and 3, is connected with a flexible compressed-air-supply tube 32, (see Figs. 1, 2, and 8,) and the tube 32 is connected to a metal supply-tube 33, which receives a supply of compressed air through the axis of the bearing-bracket 3, and the supply to the plunger is controlled by a cock 33$^\times$, which is to be operated by hand.

In Figs. 3, 5, and 7 I have shown an annular channel 46 in the end of the sheath 17, and from this channel passages open into the hollow of the sheath 17$^\times$ around the nipple, and through this annular channel 46 and its diverging passages air and oil spray or other cooling and lubricating medium can be projected upon the nipple 26 when the latter is in its withdrawn position, as at Fig. 5. To this end the channel 46 is supplied by a nozzle 45, and I arrange that this spraying operation should be mechanically effected and brought into action at the time the nipple and plunger are so withdrawn within the sheath and continue in action during the whole time the plunger is in its withdrawn position. To this end I form an extension 34$^\times$ upon the lever 34, by which the plunger is lifted against the action of the spring 30, and I arrange that this lever extension 34$^\times$, Figs. 2 and 8, shall operate, when the plunger is in its completely withdrawn position, to turn on a cock 47$^\times$ and admit air from a connection with the pipe 33 to a pipe 49, which leads therefrom (see Fig. 1) and is connected by the nozzle 45, Fig. 5, with the annular channel 46 in the end of the sheath.

At Fig. 9 I have shown a cross-section of the plug of the valve 47$^\times$, which is operated as aforesaid by the extension 34$^\times$ of the lever 34, and from this view it will be seen that the bore of the plug when in one position receives a supply of oil from the oil-reservoir and when the plug is turned air is admitted from the pipe 33 and drives the oil contained in the plug along the pipe 49, from whence it is delivered in the form of spray onto the nipple. By this arrangement of devices when the nipple 26 is in the position shown at Fig. 5 the oil and air spray is delivered upon the nipple, whereas when the lever 34 is operated so as to project the nipple into the position shown at Fig. 3 the supply of oil and air spray is automatically cut off.

The operation of the mechanism is as follows: I will assume the machine to be in the position shown by the drawings at Figs. 1 and 2, with the plunger 25 and nipple 26 withdrawn into the sheath 17 17$^\times$, such a withdrawn position being shown at Fig. 5, but inverted. In this position the plunger and nipple are below and clear of the neck-mold, and the plunger 24 is held in that position by the spring 30, while the nipple, which has been brought to that position by the operation of the screw-thread on the sleeve 25 and within the end cap 17$^\times$, naturally remains there until it receives a further motion. In this position the valve 47$^\times$ is placed as shown at Fig. 9, and the current of air passes by the pipe 49, carrying with it whatever oil may be in that pipe and plays upon the withdrawn nipple through the passages which lead from the annular channel 46 in the end of the sheath 17. The nipple 26 is then projected from the end cap 17$^\times$ of the sheath 17 by operation by hand of the handle 50, which through the gearing 51 54 53 52 revolves the plunger 24 and with it the sleeve 25, which brings out of the sheath the nipple 26 into the position shown at Fig. 7. The stud on the sleeve 25 being at the end of the groove 24$^\times$ of the plunger 24 causes the plunger to be also projected with its end flush with the nipple, and the latter projects into the neck-mold, the sections of which are closed, and the molten metal is then served to the parison-mold 8 and runs into the neck-mold 19. It will be obvious that the plunger 24 follows the motion of the nipple during its projection, and, referring to Fig. 3, it draws up with it through that distance the collar 31 and causes the extension 34$^\times$ of the lever 34 to be moved, which closes the air and oil admission valve 47$^\times$, and so stops the cooling and lubricating supply during the time the nipple and plunger are in projection. This being done, the handle 37 is depressed and carries the plunger 24 alone forward into the molten metal to pierce the same, after which the said handle 37 is released and the spring 30 brings the plunger down again flush with the top of the nipple, as at Fig. 7. The bracket 3 is then rotated by the handles 4 5 through an angle of one hundred and eighty degrees, which causes the separation of the halves of the parison-mold 8, and then the preliminary blowing operation is effected, the compressed air for this purpose being supplied through the hollow plunger 24 by turning the cock 33$^\times$, and the finishing-mold 40, Fig. 1, is then brought into position, closed upon the pendent parison, which is supported by its neck from the inverted neck-mold, and the blowing operation is completed. The handle 50 is then operated, and acting through the gearing the plunger 24 is rotated, causing the sleeve 25 to accompany its motion, which causes the withdrawal of the nipple into its sheath from the position shown at Fig. 7 to that shown at Fig. 5, and then the handle 37 is operated to rock the lever 34 and withdraw the plunger until the stud on the sleeve 25 is against the end of the slot 24× in the plunger. The handle 23, Fig. 2, is then operated to slide the collar 21 upon the casing and by the links 20 to separate the two halves of the neck-mold 19 against the action of the spring 22. The handle 37 may be temporarily fastened in its retracted position by a detent 38, Figs. 2 and 3, interlocking with a notched sector 39 and disengaged therefrom by the hand which grasps said handle 37. The formed bottle is then contained within the finishing-mold quite free from the neck-mold and from the nipple and plunger, and the finishing-mold containing the bottle can be moved away in a horizontal direction.

The finishing-mold, as is common, is made in two halves 40, pivoted together at 41 to a bracket 42, carried by an arm 43, pivoted upon a slide-bracket 44, adjustable vertically by rack and pinion upon and carried by the main standard of the machine-frame, so that the mold may be swung outward or be brought in position beneath and around the parison, as desired. When the two halves of the finishing-mold are closed together, they are secured by any suitable locking device—such as indicated at 57, Fig. 1—operated by a handle, such as that marked 56.

What I claim as my invention, and desire to secure by Letters Patent, is—

1. In a machine for manufacturing glass bottles with interiorly-screw-threaded necks, the combination with a divided neck-mold for forming the exterior of the bottle-neck, and means for closing together the parts composing the neck-mold when forming the bottle and for separating the same to release the formed bottle; of a sheath located coaxially with the neck-mold, and slides upon the sheath to carry the separable halves of the said neck-mold, a tubular nipple and a screw-thread formed exteriorly thereon to produce a screw-thread in the interior of the bottle-neck, a sleeve carrying the nipple and extending within the sheath, a screw-thread on the sleeve, and an end cap on the sheath with which the thread upon the sleeve engages, a plunger passing into the sleeve and nipple and having its end normally flush with the end of the nipple, a stud on the nipple-sleeve engaging a groove on the plunger, a spring on the plunger to hold the end of the latter normally flush with the end of the nipple and to return the plunger after it has been projected, and means for rotating the plunger to project the nipple into the neck-mold and for withdrawing it therefrom by a rotary action while the plunger accompanies same, and means for projecting the plunger independently of and beyond the projected nipple to pierce the parison, substantially as set forth.

2. In a machine for manufacturing glass bottles with interiorly-screw-threaded necks, the combination with a stationary frame, a reversible bracket carried on the frame, a divided neck-mold for forming the exterior of the bottle-neck, and means for closing together the parts composing the neck-mold when forming the bottle and for separating the same to release the formed bottle; of a sheath carried by the reversible bracket and located coaxially with the neck-mold, slides upon the sheath to carry the separable halves of the said neck-mold, a tubular nipple, a screw-thread formed exteriorly thereon to produce a screw-thread in the interior of the bottle-neck, a sleeve carrying the nipple and extending within the sheath, a screw-thread on the sleeve, and an end cap on the sheath with which the thread upon the sleeve engages, a plunger passing into the sleeve and nipple and having its end normally flush with the end of the nipple, a stud on the nipple-sleeve engaging a groove on the plunger, a spring on the plunger to hold the end of the latter normally flush with the end of the nipple, a pinion on the plunger exterior of the sheath engaging the said plunger by feather and groove, a toothed segment pivoted on the reversible bracket, a handle for partly rotating the segment, gearing connecting the segment and the pinion for rotating the plunger and the nipple to project them into and withdraw them from the neck-mold, and means for projecting the plunger independently of and beyond the projected nipple to pierce the parison and for returning the same to position, substantially as set forth.

3. In a machine for manufacturing glass bottles with interiorly-screw-threaded necks, the combination with a stationary frame, a reversible bracket carried by the frame, a divided neck-mold for forming the exterior of the bottle-neck, and means for closing together the parts composing the neck-mold when forming the bottle and for separating the same to release the formed bottle; of a sheath carried by the reversible bracket and located coaxially with the neck-mold, slides upon the sheath to carry the separable halves of the said neck-mold, a tubular nipple, a screw-thread formed exteriorly thereon to produce a screw-thread in the interior of the bottle-neck, a sleeve carrying the nipple and extending within the sheath, a screw-thread on the sleeve, and an end cap on the sheath with which the thread upon the sleeve engages, a plunger passing into the sleeve and nipple and having its end normally flush with the end of the nipple, a stud on the nipple-sleeve engaging a groove on the plunger, a spring on the plunger to hold the end of the latter normally flush with the end of the nipple and to return the plunger after it has been projected, a pinion on the plunger exterior of the sheath engaging the said plunger by feather and groove, a toothed segment pivoted on the reversible bracket, a handle for partly rotating the segment, gearing connecting the segment and pinion for rotating the nipple and plunger to project them by a screw action into and from the neck-mold, a lever fulcrumed to the reversible bracket, and connections between the lever and plunger for projecting the plunger independently of and beyond the projected nipple to pierce the parison, substantially as set forth.

4. In a machine for manufacturing glass bottles with interiorly-screw-threaded necks, the combination with a stationary frame, a reversible bracket carried by the frame, a sheath carried by the bracket, slides carried by the sheath, a divided neck-mold carried by the slides, means for separating and closing together the portions of the neck-mold, a separable parison-mold which is closed above and coincides axially with the neck-mold when the bracket is in one position, and a separable finishing-mold carried by the frame to coincide and come axially below the neck-mold when the bracket is in its other position; of a tubular nipple, a screw-thread formed exteriorly thereon to produce a screw-thread in the interior of the bottle-neck, a sleeve carrying the nipple and extending within the sheath, a screw-thread on the sleeve, and an end cap on the sheath with which the thread upon the sleeve engages, a plunger passing into the sleeve and nipple and having its end normally flush with the end of the nipple, a stud on the nipple-sleeve engaging a groove on the plunger, a spring on the plunger to hold the end of the latter normally flush with the end of the nipple and to return the plunger after it has been projected, a pinion on the plunger exterior of the sheath engaging the said plunger by feather and groove, a toothed segment pivoted on the reversible bracket, a handle for partly rotating the segment, gearing connecting the segment and pinion for rotating the nipple and plunger to project them by a screw action into and from the neck-mold, a lever fulcrumed to the reversible bracket, and connections between the lever and plunger for projecting the plunger independently of and beyond the projected nipple to pierce the parison, substantially as set forth.

THOMAS WILLIAM SIMPSON.

Witnesses:
JOHN JOWETT,
FRANCIS W. BARRACLOUGH.